United States Patent
Farine et al.

(10) Patent No.: US 6,694,276 B2
(45) Date of Patent: Feb. 17, 2004

(54) METHOD FOR CONTROLLING A NAVIGATION DEVICE AND NAVIGATION DEVICE IMPLEMENTING THE SAME

(75) Inventors: Pierre-André Farine, Neuchâtel (CH); Fanel Piccini, Chambrelien (CH); Thien Kim, Les Tuileries-de-Grandson (CH)

(73) Assignee: Asulab SA (CH)

( * ) Notice: Subject to any disclaimer, the term of this patent is extended or adjusted under 35 U.S.C. 154(b) by 124 days.

(21) Appl. No.: 09/892,421

(22) Filed: Jun. 26, 2001

(65) Prior Publication Data

US 2002/0004708 A1 Jan. 10, 2002

(30) Foreign Application Priority Data

Jul. 4, 2000 (CH) ................................................ 1323/00

(51) Int. Cl.[7] .............................. H04B 7/216; G01S 5/02
(52) U.S. Cl. .................... 702/94; 342/357.12; 375/200; 701/213; 702/97
(58) Field of Search .............................. 702/85, 94, 95, 702/96, 97, 149, 150, 158; 701/119, 120, 121, 122, 213, 214, 216, 217; 324/357.12; 375/200, 311, 316

(56) References Cited

U.S. PATENT DOCUMENTS 5,949,812 A * 9/1999 Turney et al. .............. 375/200
6,032,108 A 2/2000 Seiple et al. ................. 702/97
6,421,609 B2 * 7/2002 Kohli .......................... 701/213
6,441,780 B1 * 8/2002 Rog et al. ............... 342/357.12

FOREIGN PATENT DOCUMENTS

| EP | 10206520 | 7/1998 |
| WO | WO 97/14049 | 4/1997 |
| WO | WO 99/19742 | 4/1999 |

* cited by examiner

Primary Examiner—John Barlow
Assistant Examiner—John Le
(74) Attorney, Agent, or Firm—Richard K Robinson

(57) ABSTRACT

There is described a method for controlling a navigation device, such as a satellite navigation device like a GPS, GLONASS, GALILEO or other receiver, and a navigation device allowing this control method to be implemented. According to the invention, the operation of the navigation device is adjusted as a function of a measurement of the velocity (v) of the navigation device for the purpose of saving energy. In particular, the operating frequency ($f_{ck}$) of the processing unit (18) with which the navigation device is fitted is adjusted to a plurality of so-called reduced operating frequencies ($f_{ck2}$, $f_{ck3}$, $f_{ck4}$, $f_{ck5}$) lower than the normal operating frequency ($f_{ck1}$) as a function of the value of the velocity measurement (v). The invention is intended in particular to allow a navigation device to be integrated in a portable object of small volume powered by a battery or a rechargeable accumulator, such as a timepiece.

14 Claims, 3 Drawing Sheets

METHOD FOR CONTROLLING A NAVIGATION DEVICE AND NAVIGATION DEVICE IMPLEMENTING THE SAME

FIELD OF THE INVENTION

The present invention generally concerns a method for controlling a navigation device powered by a battery or a rechargeable accumulator, such as a satellite navigation device like a GPS, GLONASS or GALILEO (future European navigation system) receiver, and a navigation device implementing this method. The navigation device according to the present invention is intended in particular to be incorporated in a timepiece. In this regard, the present invention also concerns a timepiece including a navigation device of the aforementioned type.

BACKGROUND OF THE INVENTION

The use of navigation devices, and in particular GPS receivers was, until recently, essentially reserved for a limited number of applications. Recently, such use has become commonplace and generalised, and more and more commercial applications use such devices. Within the framework of this generalisation, one now sees navigation devices integrated in portable objects of small volume powered by a battery or a rechargeable accumulator. Thus, portable objects integrating a navigation function, such as timepieces in the form of wristwatches, have been on the market for a short while.

One fundamental problem of such battery powered portable objects resides in their greatly reduced working autonomy. A navigation device typically constitutes a high power consuming module which, if it is permanently activated, quickly exhausts the capacity of the battery or the accumulator powering the portable object.

Various solutions have been envisaged with a view to saving energy in such devices. One of these solutions consists in particular in only activating the navigation device periodically for a reduced period of time in order to perform the necessary position and time measuring operations. A particularly interesting solution adopting this technique is disclosed in Japanese Patent Application No. 10-206520 in the name of Canon Inc., filed on Jan. 16, 1997. This solution consists in periodically deactivating a navigation device, for a variable period of time depending on the velocity of the device. For this purpose, the navigation device includes calculating means arranged to determine the velocity of the receiver on the basis of position and time measurements, and control means for varying the deactivation time of the receiver between two successive position measuring operations.

One disadvantage of the device disclosed in the aforementioned Japanese document lies however in the fact that the power consumption of the device is either maximum when the device is activated, or minimum when the device is deactivated. One perverse effect of this technique lies in the face that the battery or the accumulator used to power the portable object in which the navigation is incorporated, is subjected to strong periodic variations in power consumption. Tests performed by the Applicant have proved that this periodic charge quickly and substantially lowered the life time of the accumulator or battery used, thus reducing the working autonomy of the portable object.

The Applicant has thus been able to observe that, in practice, the navigation device disclosed in the aforementioned Japanese document proved unable to be integrated in portable objects of small volume, such as timepieces, in which the accumulator or the battery used as the electric power source constitutes a critical element which, if subjected to the constraints described above, would not have sufficient working autonomy.

The object of the present invention is thus to overcome the drawbacks encountered with the navigation devices of the prior art when the latter are periodically activated and deactivated as is shown for example by the aforementioned Japanese document.

The object of the present invention is thus in particular to propose a method for controlling a navigation device and a navigation device implementing this method so that the power consumption thereof is adjusted in an optimum manner according to the necessary level of activity.

SUMMARY OF THE INVENTION

A further object of the present invention is to propose a navigation device which proves perfectly able to be integrated in a portable object, such as a timepiece, powered by a battery or a rechargeable accumulator.

The present invention thus first concerns a method for controlling a navigation device the features of which are listed in independent claim 1.

The present invention also concerns a navigation device whose features are listed in independent claim 6.

The present invention further concerns a timepiece incorporating a navigation device of the aforementioned type.

Advantageous embodiments of the present invention form the subject of the dependent claims.

One advantage of the present invention lies in the fact that, unlike the navigation devices of the prior art, the power consumption of the navigation device is gradually adjusted as a function of the necessary level of activity. Indeed, the navigation device according to the present invention is no longer periodically activated or deactivated as is typically the case of the known navigation devices, but its operation or more precisely the operating frequency of the processing unit of the navigation device is adjusted and adapted as a function of the conditions of use. This results in considerably less significant constraints for the battery or rechargeable accumulator used to power the device.

The navigation device according to the present invention may thus advantageously be incorporated in a portable object of small volume and small capacity, such as a timepiece for example.

BRIEF DESCRIPTION OF THE FIGURES

Other features and advantages of the present invention will appear more clearly upon reading the following detailed description, made with reference to the annexed drawings which are given by way of non-limiting example and in which.

DETAILED DESCRIPTION

The present invention has been developed in particular with a view to integrating a navigation device, such as a GPS receiver, in a timepiece such as a wristwatch. It will of course be understood that the present invention should not be limited to this single application and may perfectly well be applied to any other application in which one wishes to integrate navigation functions in a portable device powered by a battery or a rechargeable accumulator.

Figure 1A:
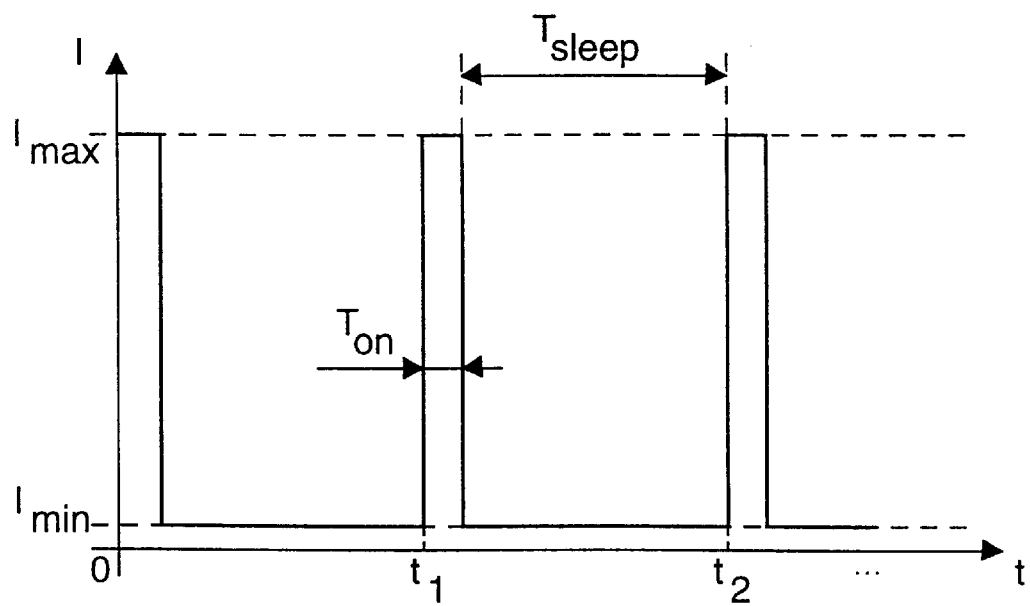
FIG. 1a shows a diagram schematically illustrating, as a function of time, the current consumption of a navigation device implementing a known solution of the prior art, this solution consisting in periodically activating and deactivating all or part of the navigation device.

FIG. 1a shows a diagram schematically illustrating the current consumption as a function of time of a navigation device implementing a known solution of the prior art, this solution consisting in periodically activating and deactivating all or part of the navigation device. This solution is for example used within the framework of the Japanese document mentioned in the preamble.

This known solution consists, as has already been mentioned, in periodically activating and deactivating the navigation device. Thus, at determined instants O, $t_1$, $t_2$, . . ., the navigation device is activated for a generally determined period of time $T_{on}$ in order to allow the desired position, velocity and time measuring operations or "PVT measurements". The navigation device is then deactivated for a determined period of time $T_{sleep}$ which can be either constant, or variable as is shown by the Japanese document described in the preamble. In this state, it is important to mention that the clock pulses are typically blocked upstream of the processing unit with which the navigation device is typically provided, so that the operating frequency of this processing unit is zero. Only the elements necessary for reactivating the navigation device (clock, counter, etc.) are still operating.

According to this known solution, the current consumption, shown on the abscissa in the diagram of FIG. 1a, is either maximum at a current value $I_{max}$ when the navigation device is activated, i.e. when the rhythm of the processing unit is set normally at its operating frequency by the system clock, or minimum at a current value $I_{min}$ when the navigation device is deactivated. This minimum current value $I_{min}$ results in particular from the residual power consumption caused by the elements necessary for reactivating the navigation device and/or other elements which are still switched on in certain solutions.

The peaks in power consumption generated when the device passes from an activation state to a deactivation state, and vice versa, cause, as has already been mentioned, a substantial lowering in the lifetime of the battery or the rechargeable accumulator used to power the navigation device.

According to the present invention, and unlike the control technique illustrated in FIG. 1a, the power consumption of the navigation device is gradually adjusted as a function of the level of activity necessary.

Figure 1B:
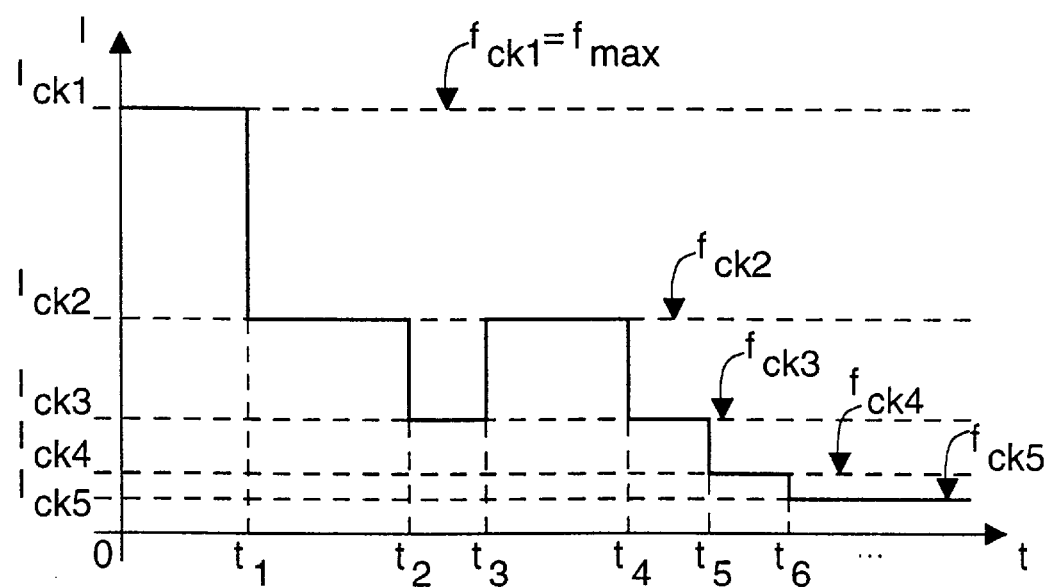
FIG. 1b shows another diagram schematically illustrating the current consumption of a navigation device implementing the control method according to the present invention.

FIG. 1b shows a similar diagram to the diagram of FIG. 1a, schematically illustrating the current consumption of a navigation device implementing the control method according to the present invention. According to the present invention, the navigation device is no longer periodically activated or deactivated but the operating frequency of the processing unit is adjusted to a plurality of so-called reduced operating frequencies $f_{ck2}$, $f_{ck3}$, $f_{ck4}$, $f_{ck5}$ which are lower than the so-called normal operating frequency $f_{ck1}$ (or $f_{max}$) of the processing unit, as a function of the value of a velocity measurement of the navigation device.

In particular, unlike the aforementioned Japanese Patent Application No. 10-206520, the navigation device or more precisely the processing unit of the navigation device is no longer deactivated for a variable period of time as a function of the measured velocity, but the operation of the device, via an adjustment of the operating frequency of the processing unit, is gradually adjusted as a function of the measured velocity.

As shown schematically by FIG. 1b, at each level of operating frequency $f_{ck1}$ to $f_{ck5}$ of the processing unit there is a corresponding current consumption level referenced $I_{ck1}$ to $I_{ck5}$, these current consumption levels obviously decreasing gradually as the operating frequency is reduced in a substantially similar ratio to the ratio of operating frequencies $f_{ck1}$ to $f_{ck5}$.

In contrast to the control method which is typically implemented, the consumption peaks generated during implementation of the method according to the present invention are substantially less significant and thus substantially less harmful to the battery or rechargeable accumulator used.

Indeed, the navigation device according to the present invention is no longer periodically activated or deactivated as is typically the case of the known navigation devices, but its operation or more precisely the operating frequency of the processing unit of the navigation device is adjusted and adapted as a function of the conditions of use. This results in considerably less significant constraints for the battery or rechargeable accumulator used to power the device.

According to the present invention, it will be preferable to associate each operating frequency $f_{ck1}$, $f_{ck2}$, $f_{ck3}$, $f_{ck4}$, $f_{ck5}$, with a determined range of velocity values, the operating frequency of the processing unit of the navigation device being adjusted to the appropriate frequency by determining in which of said ranges of velocity values the velocity measurement value of the navigation device is located. As will be seen in more detail hereinafter, the adjustment of the operating frequency can be effected by acting on a division factor of the normal operating frequency $f_{ck1}$ (or $f_{max}$) in order to derive the reduced operating frequencies $f_{ck2}$ to $f_{ck5}$.

Figure 2:
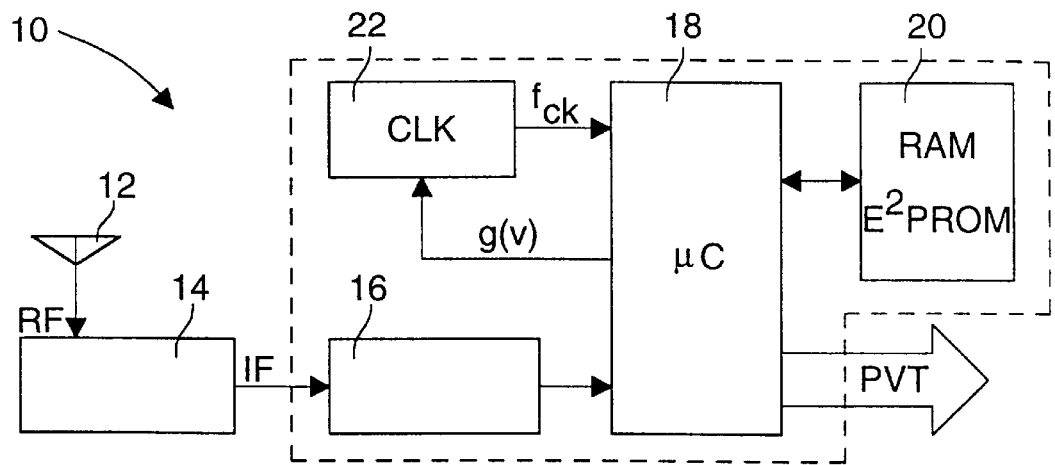
FIG. 2 shows a block diagram of a navigation device allowing the control method according to the present invention to be implemented.

FIG. 2 shows generally a block diagram of a navigation device according to the present invention, globally designated by the reference numeral 10, allowing the control method according to the present invention to be implemented. This navigation device 10, such as for example a GPS, GLONASS, GALILEO or other receiver device, is powered by a battery or a rechargeable accumulator (not shown) and typically includes receiving means for receiving the navigation signals including an antenna 12 for detecting GPS (or other) navigation signals and a receiving and shaping unit 14 of the navigation signals picked up by antenna 12. Receiving and shaping unit 14 pre-amplifies and reduces, in a conventional manner, the radio frequency RF of the GPS navigation signals (of the order of 1,57542 GHz for civilian applications) to an intermediate frequency IF allowing their processing. These signals are also typically sampled by an A/D converter at the output of receiving and shaping unit 14, in order to generate digital data able to be processed by the following stage.

Navigation device 10 further comprises, connected to the output of receiving and shaping unit 14, navigation signal processing means allowing a position, velocity, time measurement, or PVT measurements, to be extracted and generated. These processing means typically include a first correlation and demodulation unit 16 correlating the GPS navigation signals with those generated by the receiver, and a processing unit 18 allowing the data originating from correlation and demodulation unit 16 to be collected and processed in order to extract, in particular, the PVT measurements.

More specifically, correlation and demodulation unit 16 assures, on the one hand, the "acquisition of a satellite", i.e. synchronisation on the carrier of the satellite signal and correlation of the pseudo-random code transmitted by the satellite and the pseudo-random code generated locally, and, on the other hand, "the tracking of the satellite" during which the navigation signal transmitted by the satellite is demodulated in order to extract therefrom the data necessary to determine the position, the velocity and the time.

The processing means further include, associated with processing unit 18, memory means 20 (RAM, EEPROM . . . ) allowing the position, velocity and time measurements to be stored, as well as almanac data and the pseudo-random satellite codes. Processing unit 18 is further typically clocked by a clock or clock means 22 at an operating frequency $f_{ck}$. In normal time, this operating frequency $f_{ck}$ is equivalent to normal operating frequency $f_{ck1}$.

According to the present invention, clock means 22 are arranged to adjust the operating frequency of processing unit 18 to a plurality of reduced operating frequencies, of which there are four in this example, $f_{ck2}$, $f_{ck3}$, $f_{ck4}$, $f_{ck5}$, lower than normal operating frequency $f_{ck1}$, of the processing unit, as a function of the velocity measurement value v determined by the processing means. In the example, clock means 22 are thus controlled by processing unit 18 via an adjustment function symbolised g(v). As will be seen hereinafter, this function g(v) may for example consist in adjusting the division factor of clock means 22.

By way of example, clock means 22 may include, in a non limiting manner, a division chain whose division factor can be controlled. By using four binary division stages and suitable addressing means, it is for example easily possible to divide the frequency of the signal emanating from clock means 22 by factors 2, 4, 8 or 16.

It will be noted that processing unit 18, memory means 20, and clock means 22 can be integrated in the form of a single microcontroller. In this regard, within the framework of a particular embodiment example of the invention, a micro-controller of this type marketed under the reference "CoolRISC™816 8-bit Micro-controller Core" may be used. This micro-controller, developed by the CSEM, IC Design, with the collaboration of EM Microelectronic-Marin SA fulfils the functions mentioned above. In particular, this micro-controller has an internal clock clocked at 8.8 MHz and a generic instruction for frequency division by 1, 2, 4, 8 or 16 which can be executed, according to the teaching of the present invention, in order to effect the adjustment of the operating frequency of the micro-controller as a function of the measured velocity. Complementary detailed information concerning the micro-controller "CoolRISC™" can easily be found in the related technical literature accessible to those skilled in the art.

An implementation of the control method according to the present invention, which can easily be programmed and implemented by those skilled in the art by means of the aforementioned microcontroller, will now be described with reference to FIGS. 3a and 3b.

Figure 3B:
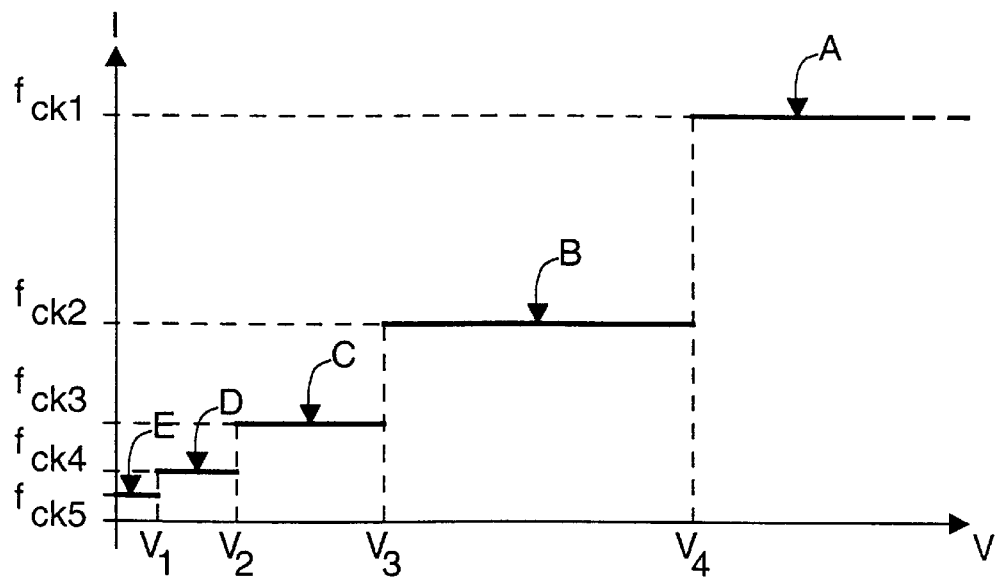
FIG. 3b illustrates the evolution, as a function of the velocity of the navigation device, of the operating frequency of the processing unit of the navigation device according to the present invention.
Figure 3A:
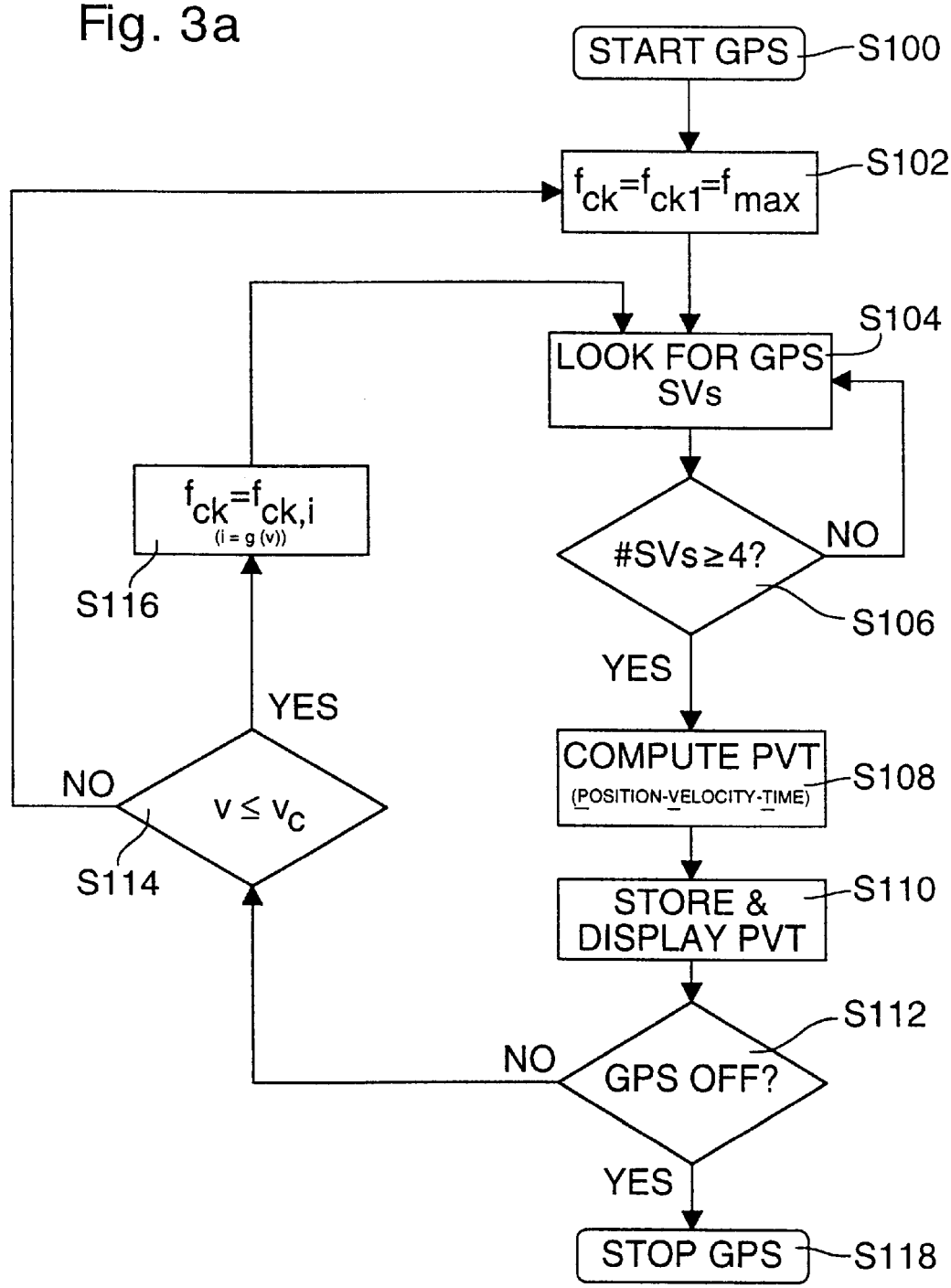
FIG. 3a shows an example of a flow diagram of the implementation of the control method according to the present invention.

FIG. 3a thus shows a flow chart of a non limiting implementation example of the control method according to the present invention. During a first step S100, the navigation device or GPS receiver is activated. This step may for example correspond to the switching on of the navigation function in a timepiece incorporating a GPS receiver according to the present invention, this function being for example activated by pressure by a user on a control member of the timepiece.

Following the activation of the GPS receiver, the operating frequency $f_{ck}$ of the processing unit ("processing unit" also means "micro-controller") is adjusted at step S102 to the normal operating frequency $f_{ck1}$ (this frequency $f_{ck1}$ may also be defined as the maximum normal operating frequency $f_{max}$).

The following step consists in searching the satellites or SV's (Satellite Vehicles). This operation is effected at step S104. Geometrically, three satellites are necessary to obtain suitable position data. In practice, however, in order to eliminate synchronisation imperfection between the local receiver clock and the satellite clocks, at least four satellites are necessary to obtain sufficiently precise position and time data. This search for at least four satellites is symbolised by the test effected at step S106.

If the number of satellites is sufficient, one proceeds to the determination, at step S108 of the position of the receiver, its velocity and the time (PVT measurements). These PVT measurements are typically stored and, if necessary, displayed as is indicated by step S110.

At step S112, it may be desirable to deactivate the GPS receiver, for example following an action by the user on a control member of the timepiece. In the affirmative, the GPS receiver is deactivated at step S118.

In the negative, however, one proceeds, at step S114 in this example, to a comparison between the measured velocity value v and a determined limit value $v_c$. This value $V_C$ may be arbitrarily fixed, for example and in a non limiting manner, at a speed of 10 kph. If the measured velocity is higher than this limit, operating frequency $f_{ck}$ of the processing unit is maintained at step S102 at the normal operating frequency $f_{ck1}$.

If, conversely, the measured velocity is less than the fixed limit $v_c$, operating frequency of the processing unit has to be adjusted at step S116 in order to adapt it to the conditions of use. As mentioned above, the operating frequency is determined according to a function g(v) of the measured velocity.

Once the operating frequency has been adjusted, the process of searching for the satellites and determining position, velocity and time measurements may be repeated again.

FIG. 3b shows schematically a non limiting example of the adjustment function g(v). This function may be symbolised as the association of an operating frequency $f_{ck1}$ to $f_{ck5}$ and a determined range of velocity values A, B, C, D, E. This function may for example be implemented in the form of a correspondence table including, on the one hand, the determined ranges of velocity values A to E, or at least information allowing these ranges to be determined (limit values $v_1$, $v_2$, $v_3$, $v_c$) and the corresponding operating frequency. By way of example, the division factor necessary for clock means 22 to generate the suitable frequency will be stored, namely 1, 2, 4, 8 or 16 for example, this being able to be achieved easily by means of the generic instruction of the aforementioned CoolRISC™ microcontroller.

In principle, adjustment of the operating frequency of the processing unit can be achieved either by directly adjusting the operating frequency to the desired value, or by gradually and sequentially adjusting the operating frequency of the processing unit to the desired value, i.e. by adjusting the operating frequency of the processing unit to another operating frequency passing through all the intermediate operating frequencies. A gradual and sequential adjustment of the operating frequency is for example illustrated in FIG. 1b.

It will be understood that either of the adjustment modes (direct or sequential) may be envisaged depending on the conditions of use. It will be understood that a sequential adjustment of the operating frequency of the processing unit offers the advantage of reducing the drops or peaks in power consumption which are damaging for the battery or rechargeable accumulator. A direct adjustment of the frequency could be envisaged in order to return the operating device quickly to a maximum operating state.

By way of advantageous variant of the navigation device according to the present invention, one may envisage providing the latter with means allowing the operating frequency of the processing unit to be automatically readjusted to the normal operating frequency $f_{ck1}$, such as for example a movement or acceleration sensor providing information to the processing unit concerning a sudden change in the user's attitude.

It will be understood that various modifications may be made to the method and the device described in the present description without departing from the scope of the invention. In particular, the number and the distribution of the various operating frequencies is in no way limited to the number (5) and the distribution (division by 1, 2, 4, 8 or 16) suggested in the present description with reference to the micro-controller used. It will also be recalled that the micro-controller used by way of example to fulfil the desired functions may be replaced by any other equivalent means fulfilling similar functions.

What is claimed is:

1. A method for controlling a navigation device, powered by a battery or a rechargeable accumulator, the navigational device including:

receiving means for receiving navigation signals;
   processing means for processing said navigation signals and for generating a position, velocity and time measurement based on said navigation signals, said processing means including a processing unit arranged to operate at a first normal operating frequency; and
   clock means for generating said normal operating frequency, wherein the control method includes the following steps:
   determining the velocity measurement of said navigation device from said navigation signals; and
   adjusting the operating frequency of said processing unit to a plurality of reduced operating frequencies lower than said normal operating frequency as a function of the value of said velocity measurement.

2. The control method according to claim 1, wherein the step of adjustment of the operating frequency of said processing unit is achieved by adjusting a division factor of said clock means.

3. The control method according to claim 1, wherein the operating frequency of said processing unit is adjusted to said normal operating frequency when the value of said velocity measurement is higher than a determined limit value.

4. The control method according to claim 1, wherein each operating frequency is associated with a determined range of velocity values.

5. The control method according to claim 4, wherein the operating frequency of said processing unit is adjusted directly or gradually and sequentially to one of said operating frequencies according to whether the value of said velocity measurement is situated in one or the other of said determined ranges of velocity values.

6. A navigation device, powered by a battery or a rechargeable accumulator, comprising:

receiving means for receiving navigation signals;
   processing means for processing said navigation signals and for generating a position, velocity and time measurement based on said navigation signals, said processing means including a processing unit arranged to operate at a first normal operating frequency; and
   clock means for generating said normal operating frequency,
   wherein said navigation device further comprises means for adjusting the operating frequency of said processing unit generated by said clock means to a plurality of reduced operating frequencies lower than said normal operating frequency as a function of the value of said velocity measurement.

7. The navigation device according to claim 6, further comprising means for adjusting a division factor of said clock means as a function of the value of said velocity measurement.

8. The navigation device according to claim 6, further comprising attitude detecting means for automatically re-adjusting the operating frequency of said processing unit to said normal operating frequency.

9. The navigation device according to claim 8, wherein said attitude detecting means for automatically re-adjusting the operating frequency of said processing unit includes a movement or acceleration sensor.

10. The navigation device according to claim 6, being included in a time piece.

11. A method for controlling a navigation device powered by a battery or a rechargeable accumulator, the navigational device comprising:

receiving means for receiving navigation signals;
    processing means for processing said navigation signals and for generating a position, velocity and time measurements said processing means including a processing unit arranged to operate at a first normal operating frequency; and
    clock means for generating said normal operating frequency, wherein this control method includes the following steps:
    measuring the velocity of said navigation device; and
    adjusting the operating frequency of said processing unit to a plurality of reduced operating frequencies lower than said normal operating frequency as a function of the value of said velocity measurement
    the operating frequency of said processing unit being adjusted to said normal operating frequency while the value of said velocity measurement is higher than a determined limit value.

12. The control method according to claim 11, wherein each operating frequency is associated with a determined range of velocity values.

13. The control method according to claim 12, wherein the operating frequency of said processing unit is adjusted directly or gradually and sequentially to one of said operating frequencies according to whether the value of said velocity measurement is situated in one or the other of said determined ranges of velocity values.

14. A navigation device powered by a battery or a rechargeable accumulator, comprising:

receiving means for receiving navigation signals;

processing means for processing said navigation signals and for generating a position, velocity and time measurement based on said navigation signals, said processing means including a processing unit arranged to operate at a first normal operating frequency; and clock means for generating said normal operating frequency, wherein said navigation device further comprises means for adjusting the operating frequency of said processing unit generated by said clock means to a plurality of reduced operating frequencies lower than said normal operating frequency as a function of the value of said velocity measurement, and wherein said adjusting means adjust the operating frequency of said processing unit to said normal operating frequency while the value of said velocity measurement is higher than a determined limit value.

* * * * *